United States Patent
Wang

(10) Patent No.: US 8,163,417 B2
(45) Date of Patent: Apr. 24, 2012

(54) ELECTRONIC DEVICE WITH BATTERY SECURING MECHANISM

(75) Inventor: Wei-Jun Wang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 573 days.

(21) Appl. No.: 12/342,243

(22) Filed: Dec. 23, 2008

(65) Prior Publication Data

US 2010/0021803 A1    Jan. 28, 2010

(30) Foreign Application Priority Data

Jul. 23, 2008    (CN) .......................... 2008 1 0302950

(51) Int. Cl.
    *H01M 2/10*    (2006.01)
(52) U.S. Cl. .......................... 429/100; 429/96; 429/175
(58) Field of Classification Search ............. 429/97–100
    See application file for complete search history.

(56) References Cited

FOREIGN PATENT DOCUMENTS

| CN | 1937893 A | 3/2007 |
| TW | I273820   | 2/2007 |

OTHER PUBLICATIONS

Dialog Results machine translation of CN 1937893 A printed Jun. 18, 2011.*

* cited by examiner

*Primary Examiner* — Barbara Gilliam
*Assistant Examiner* — Maria J Laios
(74) *Attorney, Agent, or Firm* — Altis Law Group, Inc.

(57) ABSTRACT

An electronic device includes a main body, a battery, and a fixing module. The main body defines a receiving groove to receive the battery. The battery defines a latching groove. The fixing module includes a fixing member, an elastic member, and a touching member. The touching member urges the elastic member such that the elastic member drives the fixing member to rotate, thereby engaging or disengaging the fixing member with the latching groove.

12 Claims, 7 Drawing Sheets

ELECTRONIC DEVICE WITH BATTERY SECURING MECHANISM

BACKGROUND

1. Technical Field

The present invention relates to an electronic device and, more particularly, to an electronic device with a battery securing mechanism.

2. Description of the Related Art

A typical electronic device includes a main body and an elastic member. The main body defines a rectangular space for receiving a rechargeable battery. The elastic member typically has hooks engaging with openings in the main body. The elastic member extends over a top of the battery with the hooks engaged in the openings to secure the battery to the space. However, this structure of the electronic device is complicated, and costly to manufacture.

Therefore, a new electronic device is desired to overcome the above-described shortcomings.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION OF THE EMBODIMENTS

Figure 1:
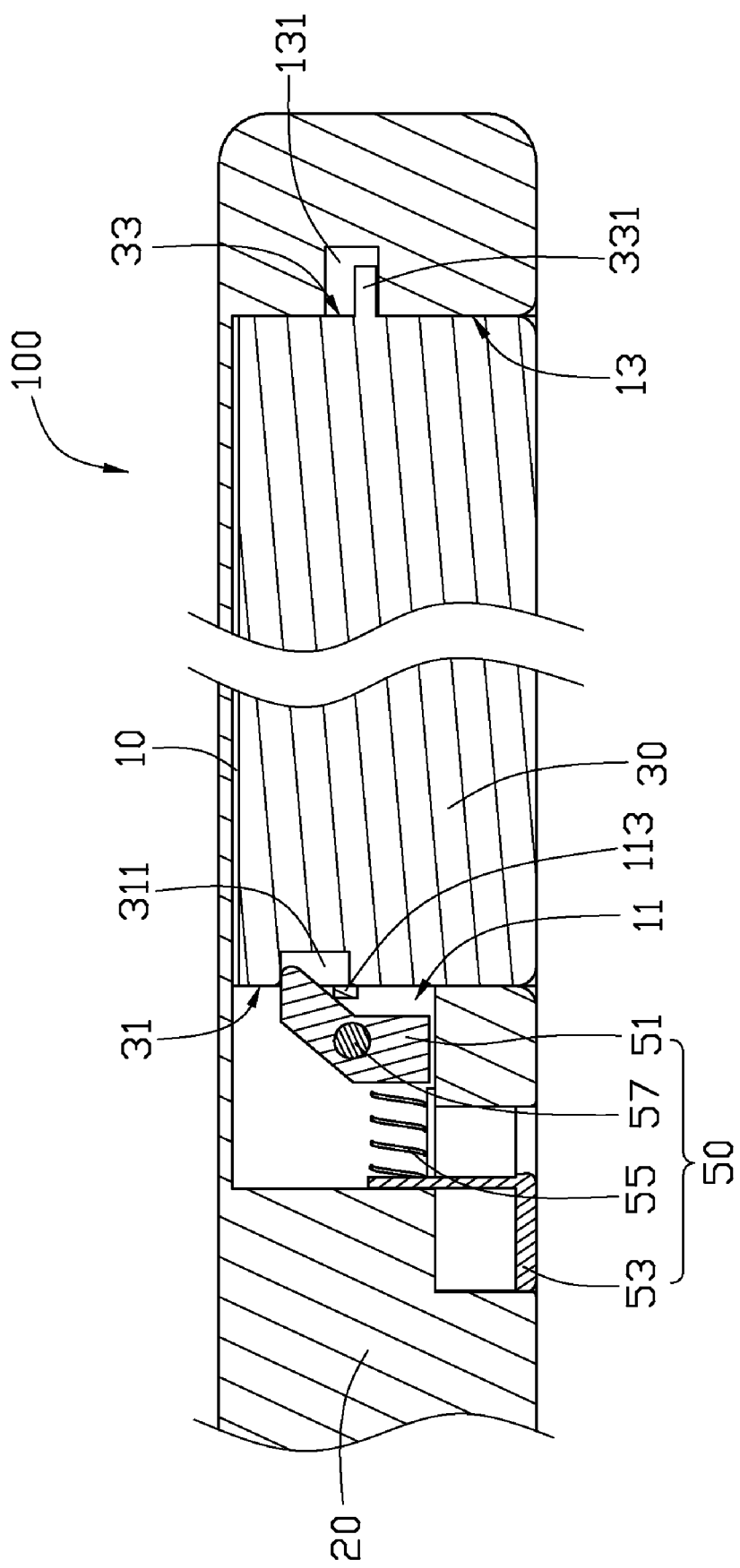
FIG. 1 is a partial, cross-sectional view of one embodiment of an electronic device, the electronic device including a main body, a battery, and a fixing module.
Figure 2:
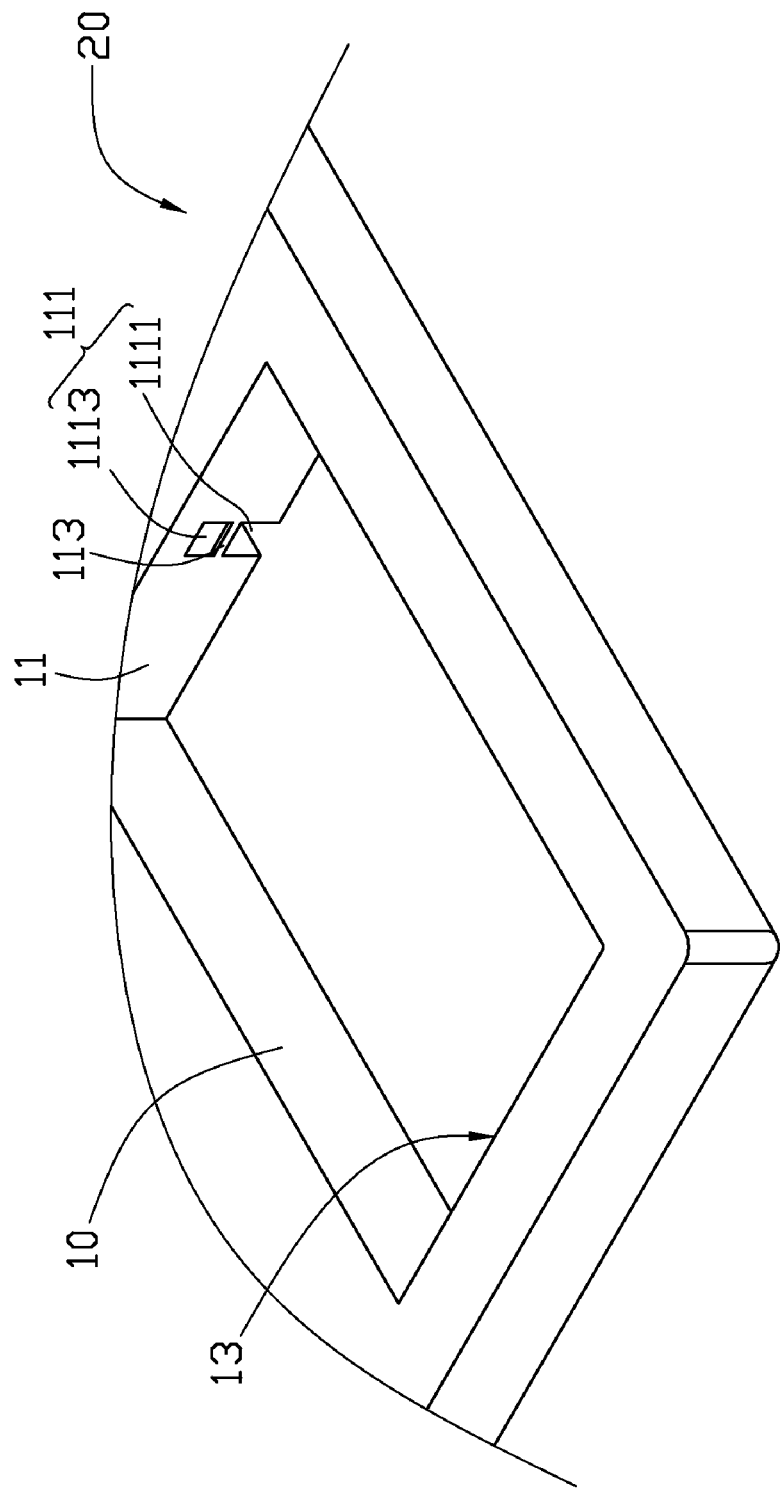
FIG. 2 is a partial, isometric view of the main body of the electronic device in FIG. 1.

Referring to FIGS. 1 and 2, an electronic device 100 includes a main body 20, a battery 30, and a fixing module 50.

The main body 20 defines a receiving groove 10. The receiving groove 10 includes a first sidewall 11 and a second sidewall 13 opposite to the first sidewall 11. The first sidewall 11 defines a through hole 111. A beam 113 is formed across the through hole 111, thereby dividing the through hole 111 into a first portion 1111 and a second portion 1113. The second sidewall 13 defines a latching groove 131.

The battery 30 includes a first side surface 31 and a second side surface 33 opposite to the first side surface 31. The first side surface 31 defines a latching groove 311. A fixing protrusion 331 is formed on the second surface 33 for engaging in the latching groove 131.

Figure 3:
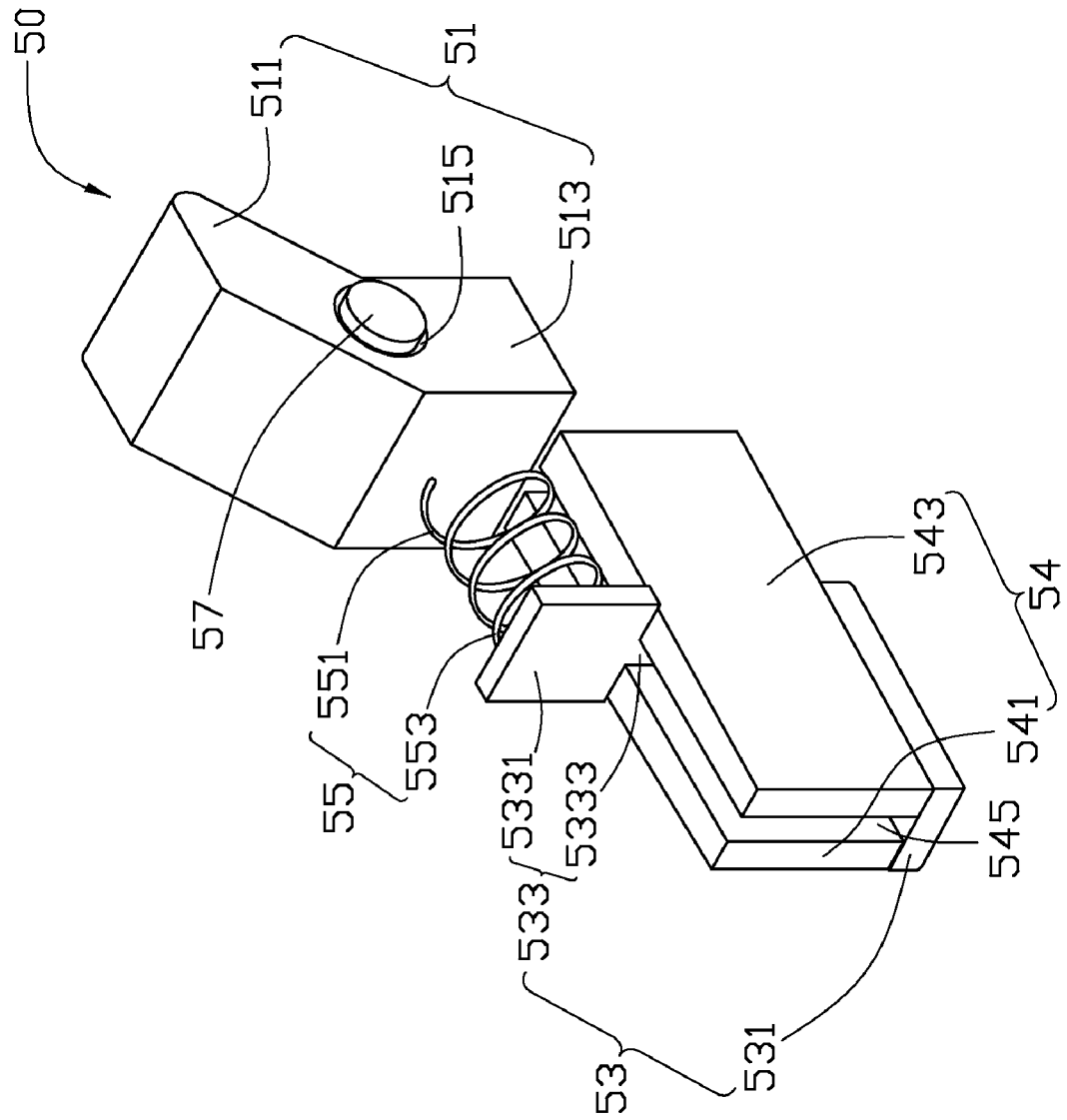
FIG. 3 is an isometric view of the fixing module of the electronic device in FIG. 1.

Referring also to FIG. 3, the fixing module 50 includes a fixing member 51, a touching member 53, a resilient member 55 connecting the fixing member 51 and the touching member 53, a guiding member 54, and a pivot shaft 57 supporting the fixing member 51.

In the illustrated embodiment, the fixing member 51 includes a fixing portion 511 and a resisting portion 513 opposite to the fixing portion 511. The fixing portion 511 and the resisting portion 513 cooperatively form a substantially V-shaped structure. A boundary between the fixing portion 511 and the resisting portion 513 defines a substantially cylindrical connecting hole 515. The fixing portion 511 is configured to be inserted into the first hole portion 1111 of the through hole 111 and the latching groove 311 of the battery 30, thereby fixing the battery 30. The pivot shaft 57 is inserted into the connecting hole 515 such that the fixing member 51 is sleeved on the pivot shaft 57 and is rotatable relative to the pivot shaft 57. The pivot shaft 57 is fixed on the main body 20, thus supporting the fixing member 51.

The touching member 53 includes a button 531 and a pushing member 533 connecting with the button 531. The button 531 is exposed out of the main body 20. In the illustrated embodiment, the pushing member 533 includes a head portion 5331 and an extending portion 5333 connecting with the head portion 5331. The head portion 5331 and the rod portion 5333 form a substantially T-shaped structure. The rod portion 5333 connects with the button 531.

The guiding member 54 includes two parallel limiting plates 541, 543. The limiting plates 541, 543 cooperatively define a guiding slot 545 The rod portion 5333 is located in the guiding slot 545 such that the touching member 53 is slidable relative to the guiding member 53.

The elastic member 55 may be a spring. The elastic member 55 is located between the fixing member 51 and the touching member 53 in a such manner that the first end 551 of the elastic member 55 is connected to the resisting portion 513 of the fixing member 51, and the second end 553 of the elastic member 55 is connected to the head portion 5331 of the pushing member 533.

Figure 4:
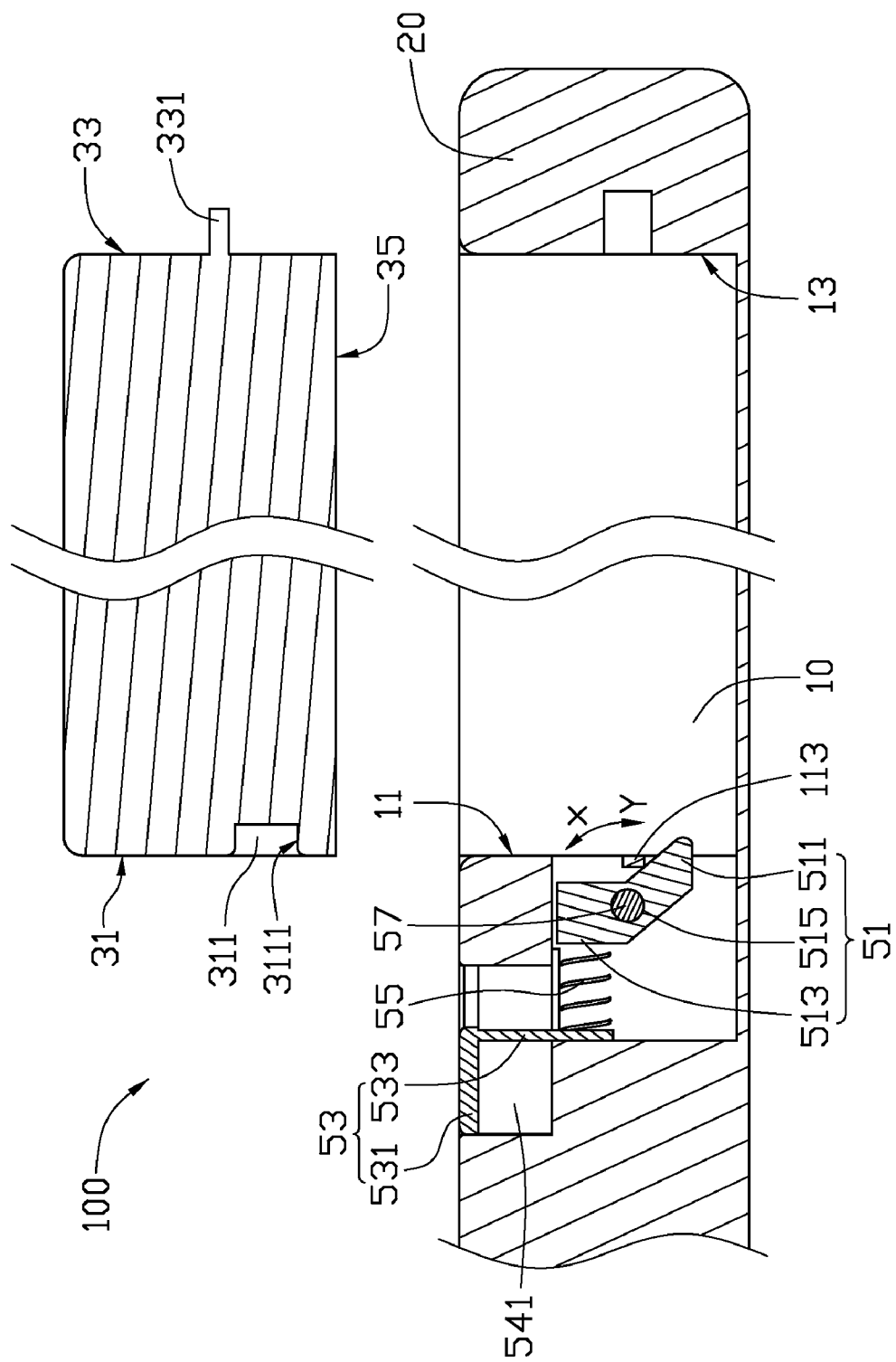
FIG. 4 is a cross-sectional view of the electronic device in FIG. 1, before assembling the battery to the main body.

Also referring to FIGS. 2 and 4, to assemble the battery 30 to the main body 20, the fixing protrusion 331 of the battery 30 is inserted into the latching groove 131 of the main body 20, and an external force is applied on the battery 30 to push the battery 30 into the receiving groove 10. A surface 35 of the battery 30 touches the fixing portion 511 of the fixing member 51 and pushes the fixing portion 511. The fixing member 51 is then rotated relative to the pivot shaft 57 along a first direction Y. Thus, the fixing portion 511 is moved out of the receiving groove 10, and the battery 30 slides into the receiving groove 10.

After the surface 35 of the battery 30 touches a bottom of the receiving groove 10, the latching groove 311 aims at the first hole portion 1111 of the through hole 111, and the fixing member 51 is rotated along a second direction X opposite to the first direction Y due to a pulling force of the elastic member 55. Finally, the fixing portion 511 of the fixing member 51 resists the beam 113 and an inner surface 3111 of the latching groove 311. Thus, the battery 30 is fixed to the main body 20, as shown in FIGS. 5 and 6.

When the battery 30 is fixed to the main body 20, both the beam 113 and the inner surface 3111 of the latching groove 311 resist the fixing portion 511 of the fixing member 51, and the fixing portion 511 of the fixing member 51 is tightly engaged in the latching groove 311. The fixing portion 511 of the fixing member 51 is now prevented from detaching from the first hole portion 1111 and the latching groove 311.

Figure 5:
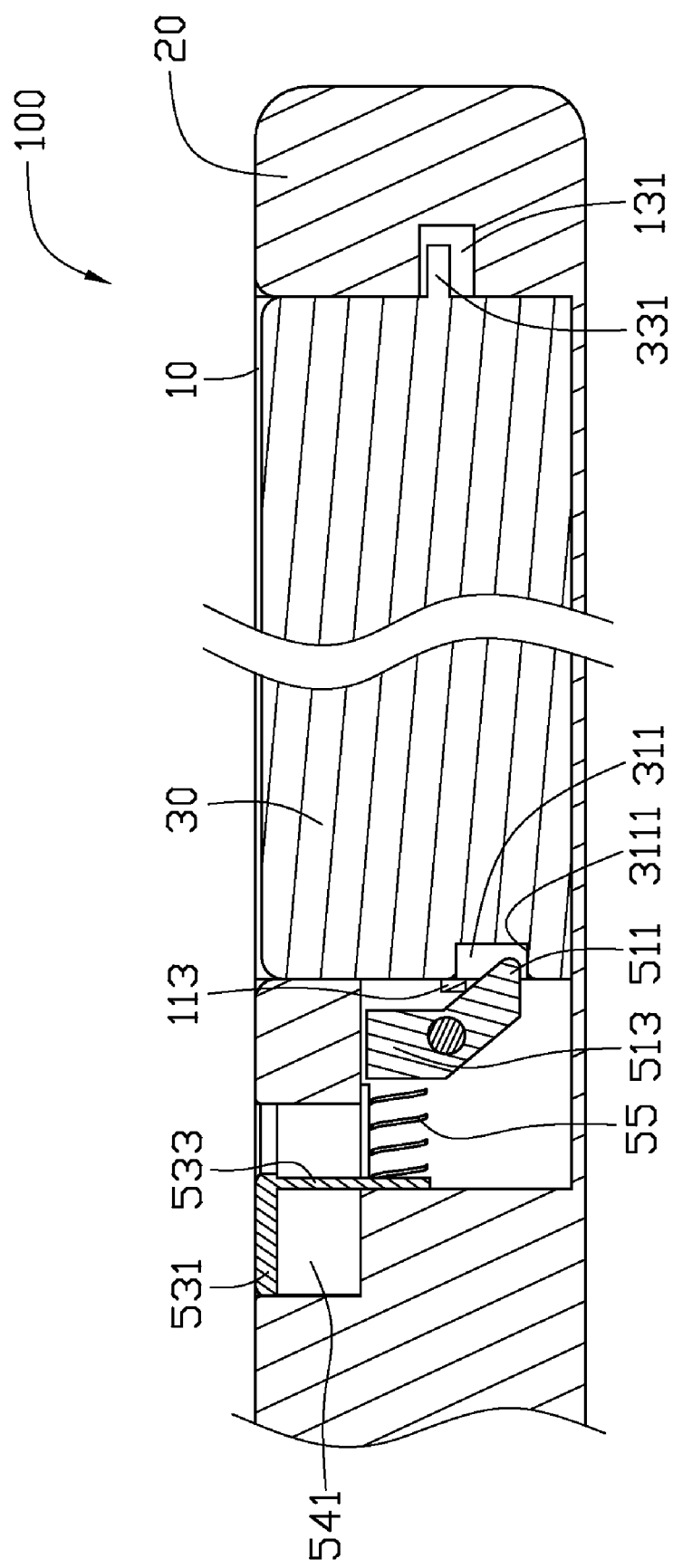
FIG. 5 is a cross-sectional view of the electronic device in FIG. 1, after assembling the battery to the main body.
Figure 6:
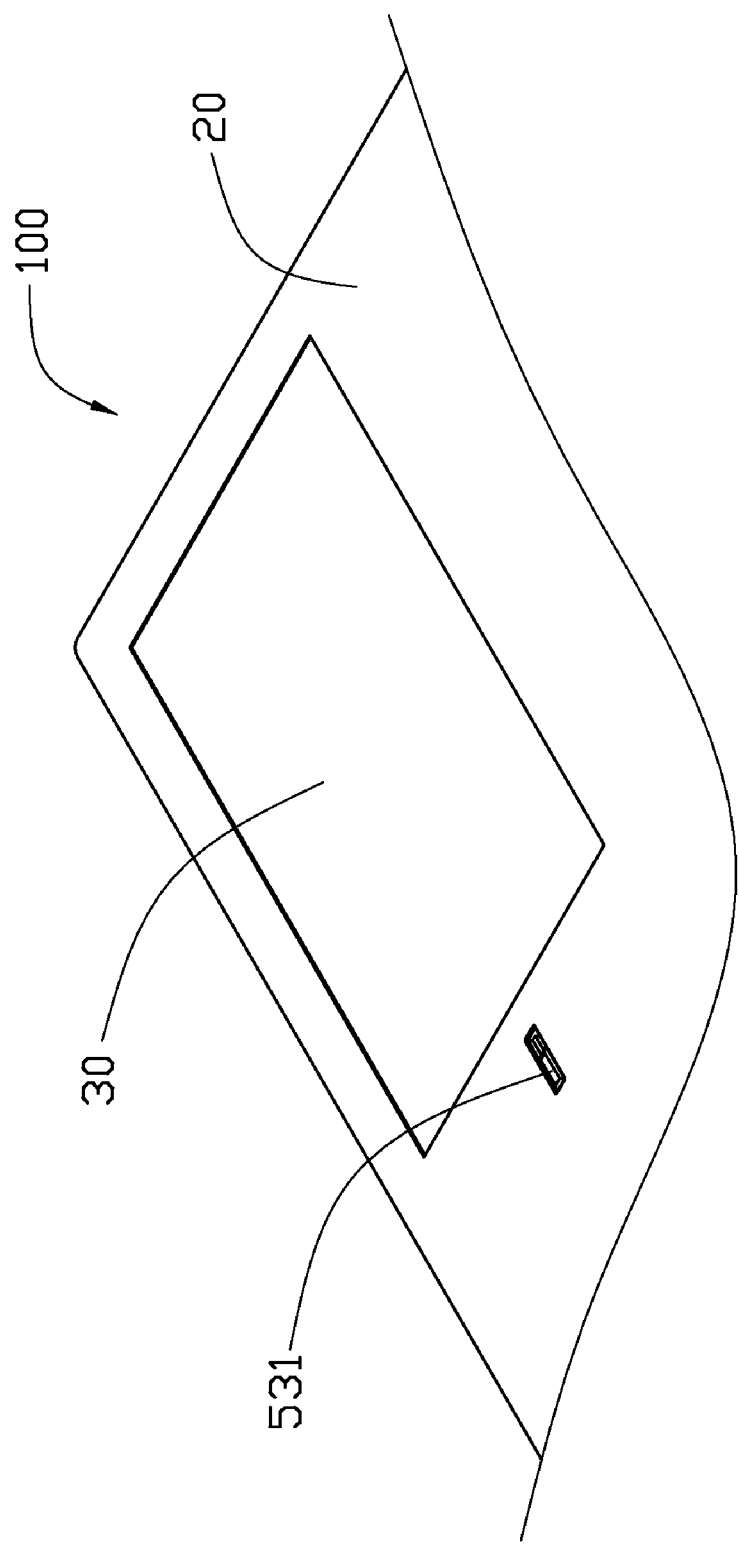
FIG. 6 is a top view of the electronic device, after assembling the battery to the main body.
Figure 7:
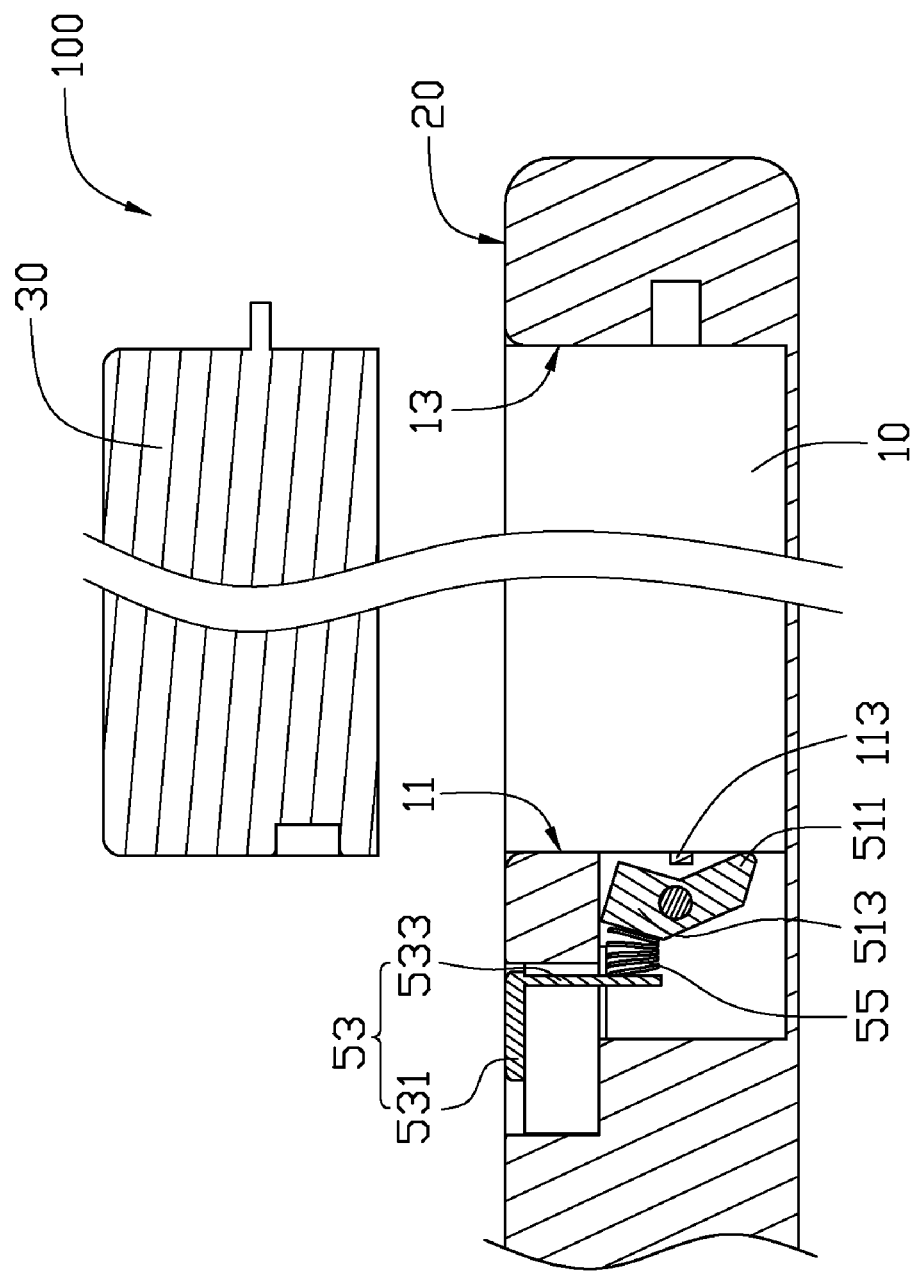
FIG. 7 is a cross-section view of the electronic device in FIG. 1, after the battery is detached from the main body.

Referring also to FIGS. 2, 5, and 7, the battery 30 from the receiving groove 10 by applying an external force on the button 531 to drive the button 531 to slide towards the receiving groove 10. The pushing member 533 compresses the elastic member 55 such that the elastic member 55 pushes the resisting portion 513 of the fixing member 51, the fixing member 51 is rotated along the first direction Y, and the fixing portion 511 is detached from the latching groove 311 of the battery 30 and the through hole 111 of the receiving groove 10. Thus, the battery 30 may be taken out from the receiving groove 10.

It can be understood that, the pushing member 533 may be other shapes such as rectangular shaped, and the fixing member 51 may be other shape such as spherical shaped.

While various embodiments have been described and illustrated, the present disclosure is not to be construed as being limited thereto. Various modifications can be made to the embodiments by those skilled in the art without departing from the true spirit and scope of the present disclosure as defined by the appended claims.

What is claimed is:

1. An electronic device, comprising:
a main body defining a receiving groove;
a battery received in the receiving groove, and the battery defining a latching groove in a side surface thereof; and
a fixing module comprising a fixing member, an elastic member, and a touching member;
wherein the elastic member is located between the fixing member and the touching member, a first end of the elastic member is connected to the fixing member and a second end of the elastic member is connected to the touching member, the touching member urges the elastic member such that the elastic member drives the fixing member to rotate, thereby engaging or disengaging the fixing member with the latching groove.

2. The electronic device as claimed in claim 1, wherein a sidewall of the receiving groove defines a through hole, the fixing member is capable of passing through the through hole to engage with the latching groove.

3. The electronic device as claimed in claim 2, wherein the fixing module further comprises a pivot shaft positioned on the main body, and the fixing member is rotatably sleeved on the pivot shaft.

4. The electronic device as claimed in claim 3, wherein the fixing member comprises a fixing portion and a resisting portion connecting with the fixing portion; the fixing portion is passed through the through hole and engages in the latching groove to fix the battery to the receiving groove, and the resisting portion connects with the elastic member.

5. The electronic device as claimed in claim 4, wherein the through hole is divided into a first portion and a second portion by a beam; the fixing portion is passed through the first hole portion of the through hole and engages in the latching groove to fix the battery to the receiving groove; the beam prevents the fixing portion of the fixing member from detaching from the through hole.

6. The electronic device as claimed in claim 4, wherein the fixing portion and the resisting portion cooperatively form a substantially V-shaped structure.

7. The electronic device as claimed in claim 6, wherein a boundary between the fixing portion and the resisting portion defines a substantially cylindrical connecting hole; the pivot shaft is passed through the substantially cylindrical connecting hole.

8. The electronic device as claimed in claim 1, wherein the touching member comprises a button and a pushing member connecting with the button.

9. The electronic device as claimed in claim 8, wherein the pushing member comprises a head portion and a rod portion connecting with the head portion; the head portion connects with the elastic member; the rod portion connects with the button.

10. The electronic device as claimed in claim 9, wherein the fixing module further comprises a guiding member; the touching member is slidably positioned on the guiding member.

11. The electronic device as claimed in claim 10, wherein the guiding member comprises two limiting plates; the limiting plates cooperatively define a guiding slot; the rod portion is located in the guiding slot such that the touching member is slidable relative to the guiding member.

12. The electronic device as claimed in claim 2, wherein another sidewall of the receiving groove defines a latching groove; the battery forms a fixing protrusion corresponding to the latching groove.

* * * * *